Figure 1:
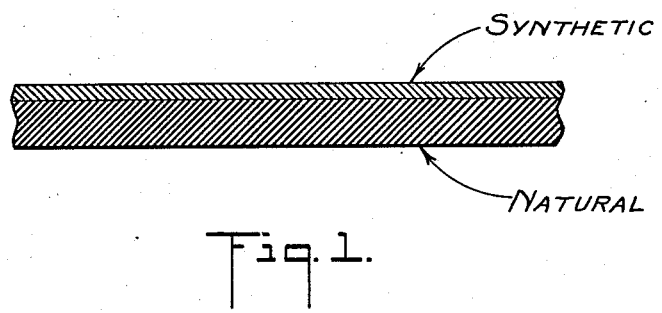

Jan. 19, 1943.  P. STAMBERGER  2,308,724
RUBBER ARTICLE
Filed May 29, 1940

INVENTOR
PAUL STAMBERGER
BY
his ATTORNEYS

Patented Jan. 19, 1943

2,308,724

UNITED STATES PATENT OFFICE 2,308,724

RUBBER ARTICLE

Paul Stamberger, Dover, Del., assignor to International Latex Corporation, Dover, Del., a corporation of Delaware Application May 29, 1940, Serial No. 337,796

7 Claims. (Cl. 18—58)

This invention relates to an article formed of dipped natural latex coated over by dipped synthetic latex.

As is well known, natural rubber has properties of elasticity and resistance to tearing when stretched which are depended upon in a great variety of commercial articles. On the other hand, natural rubber tends to deteriorate rapidly under the influence of sunlight, whereby it rapidly loses these desirable properties. In addition, it tends rapidly to lose these properties when exposed to oils such as kerosene or linseed oils and fats such as ordinary house grease or in contact with the human body.

I have found in accordance with my invention that dipped natural rubber articles may be protected from ageing by sunlight and attack by oils and fats by the application thereto in suitable proportions of synthetic rubber; and that a mixture of synthetic and natural latex or other mixed solutions of these materials will not give satisfactory results of the kind mentioned.

In accordance with my invention I have discovered that by dipping a form successively into compositions of natural latex and synthetic latex that the bond formed between the layers upon vulcanization is such that articles made in accordance with the invention, such as bathing caps, baby pants, girdles, etc., requiring extraordinary elasticity and stretchability may be stretched without rupture of the bond or injury to the protective coating. In addition, I have found that by suitably proportioning the layer of synthetic rubber with respect to the layer of natural rubber, that I can secure in the finished article the desirable properties of resistance to ageing by sunlight and resistance to tearing and resistance to oils and fats while preserving substantially the usual characteristics of elasticity and resistance to tearing which are found in natural rubber.

The products of my invention are characteristically thin-wall, materials and flexible, elastic articles made therefrom which have definite tensile strength and tear resistance requirements and are generally adaptable for personal apparel where stretching of the article to conform to various parts of the body as well as resistance to the action of solvents and atmosphere are required.

The deteriorating effects of sunlight and solvents on commercial natural rubber products has limited the commercial usefulness of these products. Tests show that natural rubber latex products will become friable and inelastic when exposed to direct sunlight for as short a time as 5 or 6 days; also when subjected to the solvent action of common organic solvents such as kerosene they will become swollen and distorted in shape and size and will also lose the desired physical properties. Similar damaging effects may be caused also by the action of certain natural oils and fats of vegetable or animal origin, such as the natural oil from the human skin where the rubber product is adapted for personal apparel.

Vulcanized synthetic rubber products have different characteristics to those of natural rubber products, in that they do not possess as great tensile strength and tear resistance as the natural rubber products and their elastic properties can only be adjusted in a more limited manner. However, they do possess greater resistance to sunlight and solvent action than the vulcanized natural rubber.

In accordance with the present invention, the commercial problem of providing a rubber product having the general tensile properties and tear resistant properties of the natural rubber layer and, at the same time, having a strong resistance to the action of sunlight and solvents, has been solved. Such a product has been made possible by superimposing separate deposits or films of natural and synthetic rubber, the synthetic film being relatively thin, and intimately combining these two rubber films so that a bond substantially as strong as the rubber material itself is produced therebetween. In the commercial product, it is important for the synthetic rubber film to be of sufficient thickness and uniformity to protect the natural rubber from the deteriorating effects of sunlight, atmosphere and solvent, but, at the same time, to be sufficiently thin to prevent substantial adverse effects on the tear resistance, tensile strength, and other physical properties of the natural rubber. In other words, the product of this invention approaches the optimum type of rubber product which has the general order of elastic properties of natural rubber and, at the same time, is strongly resistant to deterioration by light, air and solvents.

Figure 2:
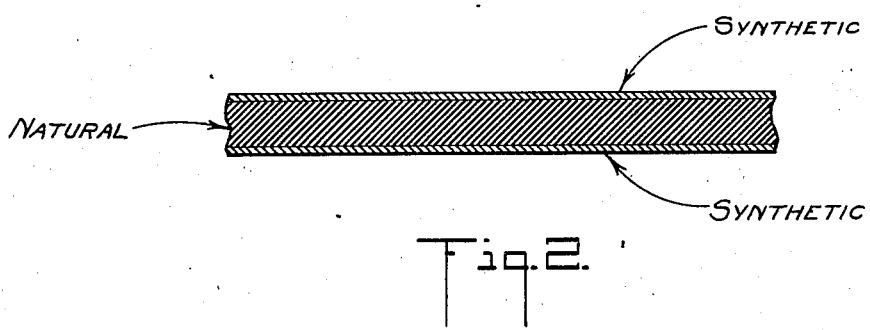

In the drawing, Fig. 1 is a cross-sectional view of a portion of an object made in accordance with an example of the invention, using one layer of natural rubber and one layer or coating of synthetic rubber; and Fig. 2 is a similar view of another embodiment of the invention utilizing one layer of natural rubber covered on both sides with layers of synthetic rubber.

A commercially advantageous process for preparing the product forming part of my invention comprises first dipping a form of the desired shape in one of the rubber dispersions, usually natural rubber latex, and the resulting film which is deposited on the form is dried or substantially dried. This procedure is repeated until the required thickness of the layer is obtained. Following this deposit, the form is then dipped into the other rubber dispersion; that is, the synthetic rubber solution, where the natural rubber has been deposited first. This second deposit or film of rubber is then dried and the thus deposited films are cured, on or off the form, to effect strong bonding between the two rubber films and eventually vulcanization of the rubber. The two rubber layers are thus simultaneously vulcanized into an intimate union with each other.

The natural and synthetic rubber materials which are used for making this composite product may be employed in the usual commercial forms; that is, as natural rubber latex and as synthetic rubber latex. The synthetic rubber latex may be, for example, a dispersion of polychloro-2-butadiene-1.3, as manufactured by the E. I. du Pont de Nemours & Co., under the tradename "Neoprene." Other forms of dispersions of synthetic rubber which may be used are: Thiokol (polyethylenesulphide) and Buna (polymethylbutadiene).

Latices of these two rubber products may be used with or without compounding agents, although in the usual case, such agents are employed to give the desired thickening, coagulating, and vulcanizing effects. Coagulants for one or both of the rubber latices may also be used if desired and are known and employed to facilitate the deposition of the rubber in the desired sheet-like or molded form.

The relative amounts of natural and synthetic rubber materials which are used for forming the composite product of this invention may be varied substantially to provide different thicknesses in the deposited films of the natural and synthetic rubber, so long as the above described resistance to sunlight and solvents is obtained and the general elastic properties of the natural rubber are also maintained. The method of depositing the rubber by dipping and principally the rate of withdrawal of the form from the dipping bath and the coagulating properties of the bath may be controlled to give the desired relative thicknesses of the two rubber deposits. If thickening agents or coagulants or both are used in the latices in which the form is dipped, the number of dips required to give the desired thicknesses of the deposit will be minimized. In some cases where relatively thin rubber films are desired, only one dip in each of the two rubber solutions will be sufficient.

The dipping forms used may be porous or nonporous although the latter are desired since they are more resistant. Suitable form materials are metal, glass or glazed ceramics.

For the usual dipping process of my invention the natural rubber latex and synthetic rubber latex compositions may be made according to the following formulae:

| Natural rubber | | Synthetic rubber | |
|---|---|---|---|
| Rubber in water dispersion | 100 | Neoprene in water dispersion | 100 |
| Zinc oxide in water dispersion | 2 | Zinc oxide in water dispersion | 5 |
| Sulphur in water dispersion | 1½ | Sulphur in water dispersion | 2 |
| Vulcanization accelerators | 1 | Vulcanization accelerator in water dispersion | 1.6 |
| Stabilizing and thickening agents. | | Thickening and stabilizing agents. | |

To prepare a hollow, relatively thin-walled article from the above formulations, a metallic mold (e. g., aluminum) shaped according to the desired article is used as the dipping form for depositing thereon the two rubber layers. The general procedure may be, for example, either one of the following:

(A) The mold is first dipped in one of the above rubber compositions, natural or synthetic, whichever is desired to be deposited first, and this dipping is repeated until the required thickness of film is obtained, with drying of the deposited films after each dipping. Then similar dipping in the other of the above rubber compositions occurs.

(B) The mold is first dipped into a rubber coagulant solution which may, for example, be made up of a 10% solution of calcium chloride and a mixture in equal parts of acetone and methyl alcohol. After the mold is withdrawn from this coagulant solution and the solvent portion thereof is permitted to evaporate from the mold, the mold is then immersed in one of the above rubber compositions. When a deposit of the required thickness is formed on the mold by the action of the coagulant, the mold is withdrawn and the deposit is dried. In the usual case where such a coagulant is used, the necessary dipping to obtain the desired thickness of rubber may require only about one or two minutes. Thereafter dipping in the other rubber composition similarly occurs.

(C) The rubber composition, such as shown in the above formulations, may be made heat sensitive; that is, coagulable by heat, by the addition of other chemicals which will provide di-valent cations, such as calcium and zinc ions. The amounts of these added ions should be such that the dipping rubber solution will not coagulate at room temperature. When using a heat sensitive rubber solution of this type, the dipping form is first heated and is then immersed in the rubber solution and withdrawn after the deposit of the required thickness is formed.

In the usual case, deposition of the rubber compound on the mold is carried out at room temperature, although, as indicated, when heat sensitive latex compounds are used, the dipping mold is heated while the rubber solution is maintained at room temperature or at a lower temperature. The drying of each of the individually deposited rubber films may be carried out either at room temperature or at elevated temperature. The elevated temperature may be applied, for example, by subjecting the form with the dipped rubber deposit thereon to heated air.

The form may be dipped first either in the natural or synthetic rubber compound shown above. Whether or not the synthetic rubber layer will be applied on one or both sides of the natural rubber layer will depend on the intended use of the article manufactured. If the article is to be exposed to sunlight, solvent or other deteriorating agent on one side only, it is necessary to apply only one layer of the synthetic rubber as shown in Fig. 1. Examples of such articles would be raincoats. Where the article will be subjected on both sides to either sunlight or solvent action, a "sandwich" type of article may be made as shown in Fig. 2 in which the natural rubber forms the middle layer and the two outer layers are made of synthetic rubber. Examples of such articles are gloves that will come in contact with both the oil of the skin and oils or fats from the liquids or objects which are being handled when the gloves are in use. Other examples are facial masks where oils or greases may come into contact with both surfaces of the product.

The following examples illustrate commercial articles which may be made in accordance with this invention and also illustrate the total thickness of such articles and the usual range of thickness of the synthetic rubber layer portion of the articles:

|  | Total thickness | Thickness of synthetic rubber |
| --- | --- | --- |
|  | Inches | Inches |
| Baby pants | 0.010-0.015 | 0.002-0.007 |
| Make-up capes | 0.010 | 0.002 |
| Girdles | 0.040 | 0.005 |
| Finger cots | 0.015 | 0.005 |
| Bandages | 0.010-0.040 | 0.003-0.0012 |
| Household gloves | 0.020 | 0.005-0.010 |
| Bathing caps | 0.010-0.020 | 0.003-0.010 |
| Toy balloons | 0.015 | 0.005 |
| Rubber thread | 0.005-0.040 | 0.002-0.010 |

As will be noted from the above illustrative but non-limiting examples the minimum thickness of the synthetic layer in such cases is about 0.002". In certain instances, however, this thickness of synthetic rubber may be reduced to about 0.001", and these two thicknesses will represent usually the minimum thickness for the synthetic layer in the composite article. It will also be noted that the total thickness of the article may be as great as 13 times or more the thickness of the synthetic layer alone. However, in the usual case, the total thickness will not be more than about 7 or 8 times, at the maximum, the thickness of the synthetic rubber layer. For a number of commercial articles, a thickness of about 0.002" to 0.007" of the synthetic rubber layer will suffice.

The following specific example of the application of this invention to the production of rubber gloves for domestic use will further serve to illustrate the principles of the invention and the type of hollow rubber articles that may be produced therefrom.

*Example*

An aluminum form having the shape of the desired rubber glove is dipped in a coagulant solution, such as the one described hereinbefore, air dried for about 5 minutes and then dipped into a natural rubber composition shown in the above formula. The form and composition are both at room temperature and the form is allowed to remain in the solution for about 40 seconds. It is gradually withdrawn from the solution at a substantially uniform rate of withdrawal and the deposited rubber film thereon is then air-dried on the mold at room temperature for about 40 minutes to 2 hours or, if speedier drying is desired, the mold may be heated to about 50-60° C., and the deposited rubber layer dried thereon for about 20-30 minutes.

After the natural rubber layer has been dried as above, the form is then dipped into the bath of synthetic rubber composition of the foregoing formulation. The dipping and withdrawing, as well as the temperature conditions for this deposit, are substantially the same as described above for the natural rubber deposit and are regulated so as to give the desired thin deposit of rubber on the dipping form. After withdrawal of the form from the synthetic latex bath the deposit is dried for about 30-60 minutes at 60° C. The deposited films are finally cured by heating for about 30 minutes at 120° C.; or if a slower curing procedure is desired, the form is heated for about 60 minutes at 100° C.

The appended claims are intended to cover the various hollow objects such as described above, and also objects which are not strictly hollow objects such, for example, as rubber thread.

What I claim is:

1. An article composed entirely of dipped vulcanized rubber and comprising superimposed dipped layers of natural rubber and synthetic rubber bonded together, the layer of synthetic rubber having substantially less thickness than the natural rubber, said article having the thickness and substantially corresponding elasticity and resistance to tearing of wearing apparel made entirely of rubber and having substantially superior resistance to sunlight, air, and solvents as compared with natural rubber.

2. An article composed entirely of dipped vulcanized rubber and comprising superimposed dipped layers of natural rubber and synthetic rubber bonded together by simultaneous vulcanization of the layers, the layer of synthetic rubber having substantially less thickness than the natural rubber, said article having the thickness and substantially corresponding elasticity and resistance to tearing of wearing apparel made entirely or rubber and having substantially superior resistance to sunlight, air, and solvents as compared with natural rubber.

3. A composite, flexible, dipped rubber product comprising a layer of natural rubber and a relatively thin protective layer of synthetic rubber superimposed upon and intimately bonded to the natural rubber to provide a substantially unitary structure in which the layer of synthetic rubber forms a substantially continuous, homogeneous protective covering for the natural rubber and substantially resists deterioration thereof by sunlight and solvents and is sufficiently thin to permit the composite product to possess substantially the same order of resistance against stretch and tear as the natural rubber.

4. A composite, flexible, dipped rubber product comprising a layer of natural rubber and a relatively thin protective layer of synthetic rubber superimposed upon and intimately bonded to the natural rubber to provide a substantially unitary structure in which the layer of synthetic rubber forms a substantially continuous, homogeneous protective covering for the natural rubber and substantially resists deterioration thereof by sunlight and solvents and is sufficiently thin to give the composite product substantially the same order of resistance against stretch and tear as the natural rubber, said synthetic rubber having a thickness not substantially greater than about one-half the thickness of the natural rubber.

5. A hollow, flexible, rubber product comprising a dipped layer of natural rubber and a thinner dipped layer of synthetic rubber superimposed upon and intimately bonded to said natural rubber to provide a substantially uniform, thin wall for said hollow object, said synthetic rubber constituting a substantially continuous homogeneous protective covering for the natural rubber and resisting deterioration thereof by sunlight and solvents and having a thickness of about 0.001" to about 0.010".

6. A hollow, flexible, rubber product comprising a dipped layer of natural rubber and a thinner dipped layer of synthetic rubber superimposed upon and intimately bonded to said natural rubber to provide a substantially uniform, thin wall for said hollow object, said synthetic rubber constituting a substantially continuous homogeneous protective covering for the natural rubber and resisting deterioration thereof by sunlight and solvents and having a thickness of about 0.002" to about 0.007".

7. A composite, flexible, dipped rubber product having a thickness and flexibility suitable for wearing apparel, comprising a dipped layer of natural rubber and a relatively thin protective dipped layer of synthetic rubber superimposed upon and intimately bonded to the natural rubber to provide a substantially uniform structure in which the dipped layer of synthetic rubber forms a substantially continuous, homogeneous protective covering for the natural rubber and resists deterioration thereof by sunlight or atmosphere and solvents and is sufficiently thin to give the composite product substantially the same order of resistance against stretch and tear as the natural rubber.

PAUL STAMBERGER.